United States Patent
Shyue

(10) Patent No.: US 6,359,936 B1
(45) Date of Patent: Mar. 19, 2002

(54) MODULATOR EMPLOYING A MEMORY REDUCTION CIRCUIT

(75) Inventor: Sheng-Wehn Shyue, ChuTung (TW)

(73) Assignee: Winbond Electronics Corp. (TW)

( * ) Notice: Subject to any disclaimer, the term of this patent is extended or adjusted under 35 U.S.C. 154(b) by 0 days.

(21) Appl. No.: 09/183,807

(22) Filed: Oct. 30, 1998

(51) Int. Cl.[7] .............................................. H04L 27/04

(52) U.S. Cl. ...................................... 375/295

(58) Field of Search ................................ 375/295, 296, 375/298, 302, 303, 304, 305, 308, 332; 332/100, 103, 106, 107

(56) References Cited

U.S. PATENT DOCUMENTS

| | | | | |
|---|---|---|---|---|
| 4,339,724 A | | 7/1982 | Feher ........................ | 375/350 |
| 4,617,535 A | * | 10/1986 | Unerdem .................... | 332/104 |
| 4,672,634 A | * | 6/1987 | Chung et al. ............... | 332/101 |
| 5,022,054 A | | 6/1991 | Wang ........................ | 332/700 |
| 5,121,412 A | | 6/1992 | Borth ........................ | 332/104 |
| 5,148,448 A | * | 9/1992 | Karam et al. ............... | 375/298 |
| 5,285,479 A | * | 2/1994 | Iwane ........................ | 375/298 |
| 5,802,104 A | * | 9/1998 | Thomas ..................... | 375/222 |
| 5,881,109 A | * | 3/1999 | Kim et al. .................. | 375/298 |
| 6,239,666 B1 | * | 5/2001 | Omori ....................... | 332/103 |

OTHER PUBLICATIONS

Dr. Feher Associates Patented Filter, Digital Signal Processing, and Correlated Modulation/RF Amplification Mears: GMSK, GFSK, FBPSK and FQPSK Implementations of Digcom, Inc. Licensed Technologies.

* cited by examiner

Primary Examiner—Tesfaldet Bocure
(74) Attorney, Agent, or Firm—Raymond Sun

(57) ABSTRACT

An improved single channel modulator employs a memory reduction circuit. The single channel modulator receives input data symbols and a clock signal, and responsive thereto, generates frequency variation trajectories b(t) that are used to generate a modulated signal s(t). An improved digital pulse shaping filter that performs a convolution operation between the input data symbols and a pulse shaping filter function g(t) is provided. The pulse shaping filter includes a counter, a shift register, and a memory that stores encoded non-duplicative values of the pulse shaping responses. The memory has an input for receiving address signals. The counter provides a first set of address signals to the memory, and the shift register provides an output. A memory reduction circuit is coupled to the shift register to receive an input data symbol, and based on the input data symbol, provides a second set of address signals to the memory. The memory reduction circuit also selectively provides either the output of the memory or a modified output of the memory. A non-linear digital to analog converter (DAC) is coupled to the memory reduction circuit for converting the output of the memory reduction circuit to a corresponding digital value. A filter is coupled to the DAC to filter the output of the DAC and provide the frequency variation trajectories b(t).

21 Claims, 15 Drawing Sheets

LEGEND:
Tx PATTERN NO=(a(n-1),a(n),a(n+1))
=a(n-1)*4+a(n)*2+a(n+1)

| TRANSMITTING DATA BITS | | | SAMPLING NO DURING A BIT INTERVAL | | | | | | | | | | | |
|---|---|---|---|---|---|---|---|---|---|---|---|---|---|---|
| $a_{n-1}$ | $a_n$ | $a_{n+1}$ | 1 | 2 | 3 | 4 | 5 | 6 | 7 | 8 | 9 | 10 | 11 | 12 |
| 0 | 0 | 0 | (1) | (1) | (1) | (1) | (1) | (1) | (1) | (1) | (1) | (1) | (1) | (1) |
| 0 | 0 | 1 | (1) | (1) | (2) | (3) | (4) | (5) | (6) | (8) | (10) | (12) | (14) | (15) |
| 0 | 1 | 0 | (16) | (17) | (18) | (20) | (22) | (24) | (24) | (22) | (20) | (18) | (17) | (16) |
| 0 | 1 | 1 | (16) | (17) | (19) | (21) | (23) | (25) | (26) | (27) | (28) | (29) | (30) | (30) |
| 1 | 0 | 0 | (15) | (14) | (12) | (10) | (8) | (6) | (5) | (4) | (3) | (2) | (1) | (1) |
| 1 | 0 | 1 | (15) | (14) | (13) | (11) | (9) | (7) | (7) | (9) | (11) | (13) | (14) | (15) |
| 1 | 1 | 0 | (30) | (30) | (29) | (28) | (27) | (26) | (25) | (23) | (21) | (19) | (17) | (16) |
| 1 | 1 | 1 | (30) | (30) | (30) | (30) | (30) | (30) | (30) | (30) | (30) | (30) | (30) | (30) |

FIG. 12

MODULATOR EMPLOYING A MEMORY REDUCTION CIRCUIT

BACKGROUND OF THE INVENTION

1. Field of the Invention

The present invention relates generally to modulators, and more specifically, to an improved modulator that employs a memory reduction circuit.

2. Background Art

Wireless telephones (also referred to commonly as cordless telephones) have become more and more prevalent in homes and offices. Wireless telephones offer convenience and flexibility over telephones with cords by un-tethering the user from the telephone and allowing the user to move about without worrying about the length of the cord and other restrictions imposed by the cord. The basic components of a typical wireless telephone are (1) a base that connects to a telephone jack, which provides a connection with a central office, and (2) a handset that is portable and that can be remote from the base. Voice data is communicated between the base and the handset.

There are two important considerations in the design and implementation of cordless telephones. First, it is important that the components employed by both the base and handset are such that the resulting system provides a good quality and accuracy in the voice data communicated between the base and the handset. Second, it is important to fulfill the first goal while reducing the costs of these components, if possible.

A transmitter is an important component that is needed by both the base and the handset for facilitating the transmission of voice data between the base and handset. An important component in the transmitter is a modulator which modulates voice data into a modulated signal that is suitable for transmission. Conventional modulators have been complex, difficult to implement, and expensive. Since the modulator is employed twice in every cordless phone system (i.e., implemented at the base and also in the handset), any costs savings and simplification in the design of the modulator circuit are multiplied by a factor of two.

Conventional cordless telephones employ transmitters that use a quadrature modulator, which is well known in the art. Examples include U.S. Pat. No. 5,022,054 (Wang), which describes a "Digital GMSK Modulator with Non-integer Bit Interval Handling", and U.S. Pat. No. 5,121,412 (Borth), describes an "All-Digital Quadrature Modulator".

FIG. 1 illustrates the general functional blocks of a conventional modulator. More specifically, FIG. 1 is a block diagram illustrating a conventional quadrature modulator 2. Quadrature modulator 2 includes logic 6 for receiving a dock signal 8, and data 7 to be transmitted. Logic 6 provides address signals to a first channel and a second channel. The first channel includes a first read only memory (ROM) 3A, a first digital to analog converter (DAC) 4A, a first low pass filter (LPF) 5A, and a first mixer 9A that are coupled in series. The second channel, which is parallel to the first channel, includes a second ROM 3B, a second DAC 4B, a second LPF 5B, and a second mixer 9B coupled in series. The first channel is designated as the I-channel, and the second channel is designated as the Q-channel. The outputs of the mixers 9A, 9B are summed to generate an modulated signal s(t). It is noted that two channels are employed to increase the accuracy and quality of the voice data to be transmitted.

However, such a conventional modulator suffers from the following disadvantages. First, the use of two channels duplicates several circuit elements (e.g., two ROMs 3A, 3B, two DACs 4a, 4B, two LPFs 5A, 5B, two mixers 9A 9B) thereby increasing the cost of the modulator and the overall cost to implement the transmitters. Moreover, since the ROMs 3A, 3B are used to implement the digital waveform s(t), the ROMs 3A, 3B include the look-up tables for the sine and cosine carrier signals, the sine and cosine phase data signals, multipliers and adders, thereby making the size of the ROMs 3A, 3B undesirably large. Since ROMs 3A, 3B are typically implemented as embedded ROMs, space considerations are even more important. Furthermore, such a conventional modulator employs complex digital to analog converters that are also costly to manufacture and implement.

Based on the foregoing, there remains a need for an improved modulator that overcomes the disadvantages discussed previously.

SUMMARY OF THE INVENTION

It is an object of the present invention to provide an improved digital modulator that employs a single channel.

It is a further object of the present invention to provide an improved digital modulator that exploits symmetry of frequency variation trajectories that correspond to the transmitting patterns to reduce the size of the memory employed.

It is another object of the present invention to provide an improved digital modulator that employs a memory reduction circuit for reducing the size of components used to implement the modulator.

It is a further object of the present invention to provide a modulator having a memory with a reduced size as compared to the size of memories employed in conventional modulators. In the present invention, both the size of the memory and the width of the memory are reduced. The reduced memory size and width leads to cost and space savings.

It is another object of the present invention to provide a modulator having fewer shaping filter output levels that make possible a digital to analog converter (DAC) with fewer bits and correspondingly fewer levels as compared to DACs employed in conventional modulators. A DAC with fewer bits and levels is more cost effective and easier to implement than a DAC with greater bits and levels.

In order to accomplish the objects of the present invention, a modulator is provided with a digital pulse shaping filter that performs a convolution operation between input data symbols and a pulse shaping function g(t). The pulse shaping filter includes a counter, a shift register, and a memory that stores encoded non-duplicative values of a pulse shaping response. The memory has an input for receiving address signals. The counter provides a first set of address signals to the memory, and the shift register provides an output. A memory reduction circuit is coupled to the shift register to receive an input data symbol and, based on the input data symbol, provides a second set of address signals to the memory. The memory reduction circuit also selectively provides either the output of the memory or a modified output of the memory. A digital to analog converter (DAC) is coupled to the memory reduction circuit for converting the output of the memory reduction circuit to a corresponding analog value. A filter is coupled to the DAC to filter the output of the DAC and provide the signal b(t). The resulting signal b(t) is employed by a voltage controlled oscillator (VCO) to generate a modulated signal suitable for transmission.

BRIEF DESCRIPTION OF THE DRAWINGS

The present invention is illustrated by way of example, and not by way of limitation, in the figures of the accompanying drawings and in which like reference numerals refer to similar elements and in which:

FIG. 12 is a table illustrating the decoded frequency trajectories that can be stored in the memory of FIG. 8A.

DETAILED DESCRIPTION OF THE PREFERRED EMBODIMENTS

An improved single channel modulator is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

MODULATION SCHEME

A large class of constant amplitude modulation schemes is defined by the following:

$$s(t) = \sqrt{\frac{2E}{T}} \cos(2\pi f_0 t + \theta(t, a))$$

where s(t) represents the modulated signal, and the transmitted information is contained in phase, $$\theta(t, a) = 2\pi f_d \sum_{i=-\infty}^{\infty} \alpha_i q(t - iT),$$

where $$q(t) = \int_{-\infty}^{t} g(\tau) d\tau.$$

In the above relationships, $f_d$ is a phase deviation constant, and $\alpha_i$ is the non-return to zero (NRZ) M-ary input data symbols. g(t) represents the Gaussian low pass filter pulse shaping signal. For example, g(t) can be a smoothed pulse shaping signal over a finite interval ($0 \leq t \leq LT$), where L is the length of the pulse, E is the energy of signal s(t), and T is one symbol period. The present invention utilizes these basic relationships.

The modulator of the present invention provides the following features: (1) a single channel implementation that saves duplicate circuit elements; (2) a three-bit transmitting pattern; (3) a recognition of symmetry of frequency trajectories corresponding to the transmitting patterns that allows for use of a memory having a reduced size as compared to the size of memories employed in conventional modulators; (4) a memory reduction circuit that exploits the symmetry noted above and provides access to the reduced memory, and (5) a reduction in the number of shaping filter output levels that allows for the use of a non-linear DAC having fewer bits than DACs employed in conventional modulators.

SINGLE CHANNEL IMPLEMENTATION

First, the modulator of the present invention is designed to operate in a single channel. By utilizing a single channel, circuit elements are not duplicated, thereby providing power, space and cost savings.

Figure 1:
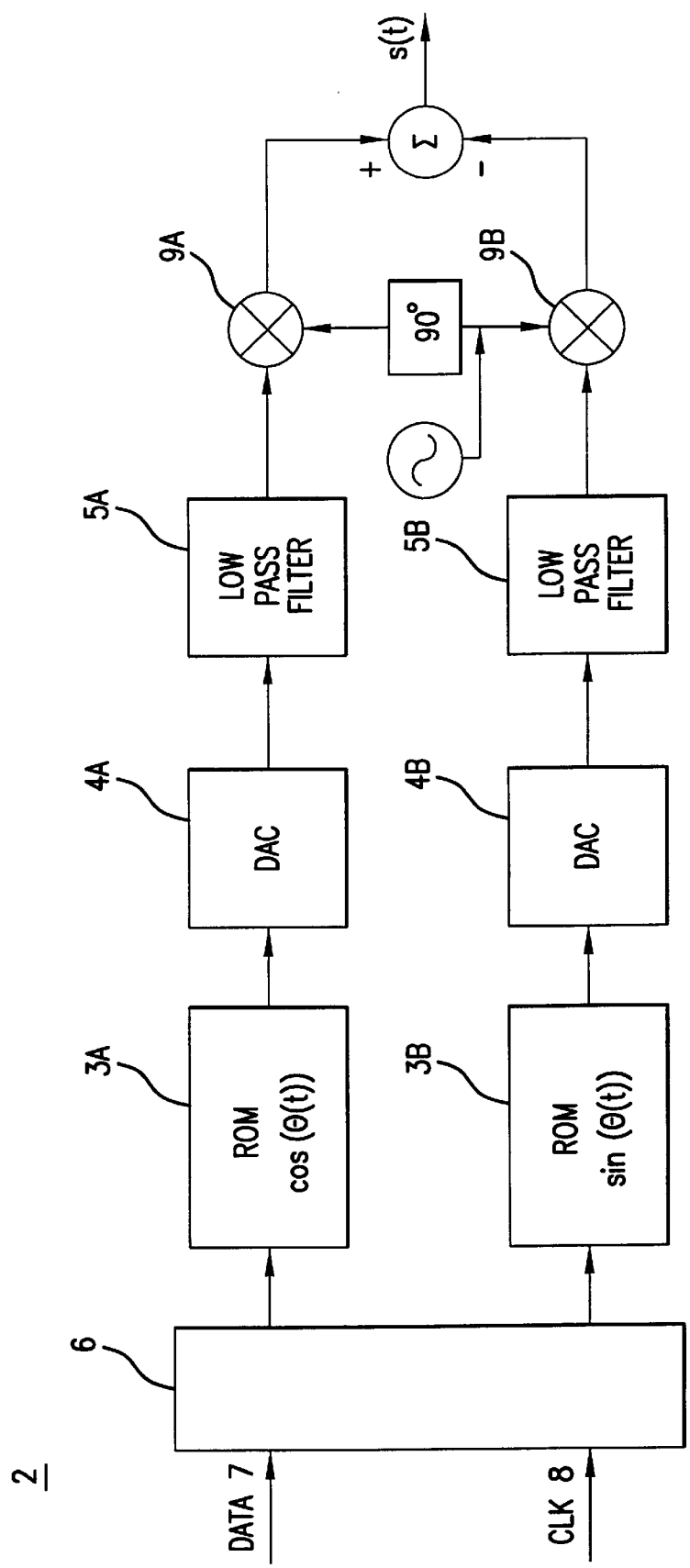
FIG. 1 is a block diagram that illustrates a conventional quadrature modulator.
Figure 2:
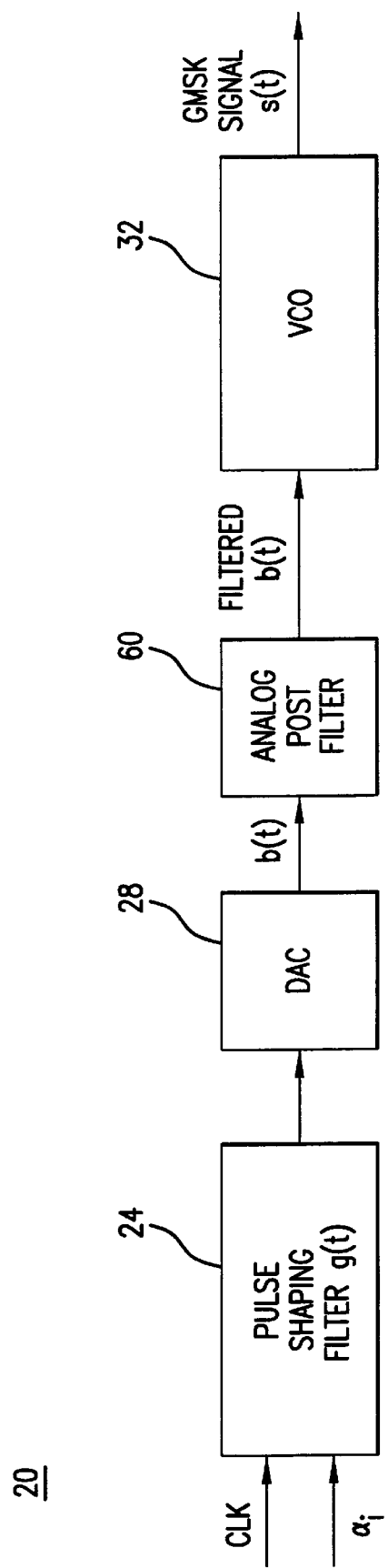
FIG. 2 is a block diagram that illustrates a single channel modulator configured in accordance with one embodiment of the present invention.

FIG. 2 is a block diagram illustrating a single channel modulator 20 that is configured in accordance with one embodiment of the present invention. The overall goal is to first derive a frequency variation trajectory b(t), explained hereinafter, from the transmitted data and then to generate the modulated signal s(t) based on b(t). The frequency variation trajectory b(t) is also referred to herein as the pulse shaping filter output. The single channel modulator 20 includes a pulse shaping filter (PSF) 24, which can be a Gaussian low pass filter (GLPF). PSF 24 receives a dock signal and transmitted data ($\alpha_i$). Based on these inputs, the PSF 24 generates a digital version of a pulse shaping filter output b(t). Depending on the applications, transmitted data ($\alpha_i$) can be data provided from a personal computer (PC) or sampled voice data from a speaker. PSF 24 can be implemented with analog components or with digital components. In the preferred embodiment, a digital implementation is used, as will be explained hereinafter.

Single channel modulator 20 further includes a DAC 28 that is coupled to PSF 24, an analog post filter 60 that is coupled to DAC 28, and a voltage controlled oscillator (VCO) 32 that is coupled to analog post filter 60. The DAC 28 receives the digital output of PSF 24 and converts the output into a corresponding analog signal, which is commonly referred to as the pulse shaping filter output b(t). Filter 60 filters the analog signal and provides b(t) to VCO 32. The VCO 32 then generates a modulated signal s(t) based on the pulse shaping filter output b(t). Since VCOs and their implementation are known by those of ordinary skill in the art, the VCOs will not be described in greater detail herein. The modulated signal s(t) is a high frequency signal that is suitable for transmission.

The modulated signal s(t), which is the output of the VCO 32, and the frequency variation trajectory signal b(t), which is the input signal to the VCO 32, can be expressed by the following equations:

$$s(t) = \sqrt{\frac{2E}{T}} \cos\left(2\pi f_0 t + 2\pi f_d \int_{-\infty}^{t} b(\tau) d\tau\right)$$

$$b(t) = \sum_{i=-\infty}^{\infty} \alpha_i g(t - iT)$$

As noted earlier, the present invention first derives the frequency variation trajectory b(t) from the transmitted data and then generates the modulated signal s(t) based on the frequency variation trajectory b(t). The VCO 32 generates a continuous phase modulated (CPM) signal s(t) based on the frequency variation trajectory signal b(t). The frequency variation trajectory b(t) is generated by convolving the input data symbols ($\alpha_i$) with a pulse shaping filter signal g(t).

The present invention can generate b(t) by calculating the summation waveform of the pulse shaping filter responses corresponding to consecutive input data symbols during one symbol interval. For different combinations of consecutive input data symbols, a different summation waveform, which is the sum of the different pulse shaping filter responses, results. The summation waveforms that occur during one symbol interval are referred to as "frequency variation trajectories" because these trajectories vary the frequency of the VCO 32.

SYMMETRY OF FREQUENCY TRAJECTORIES

Figure 9:
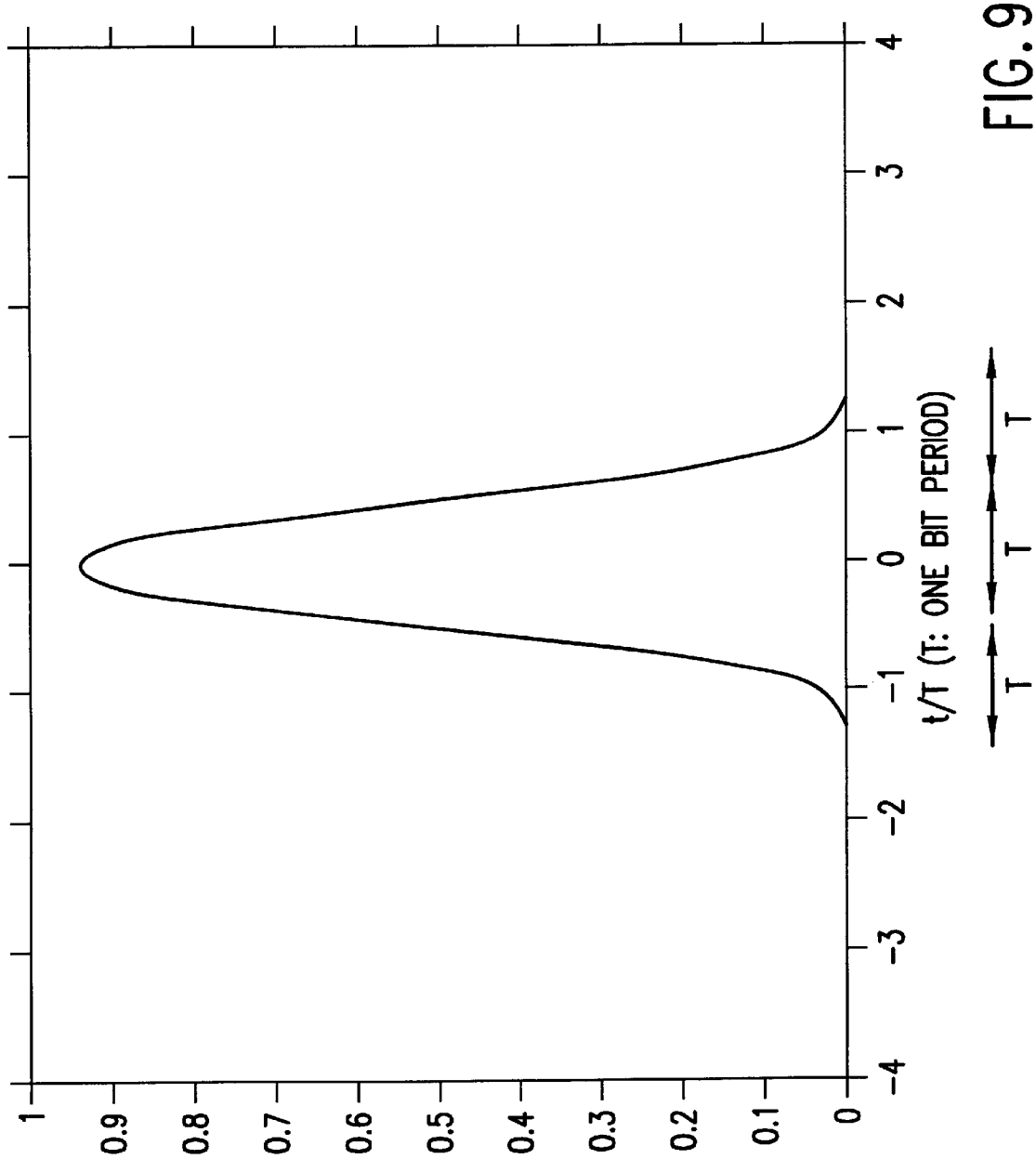
FIG. 9 is a graph illustrating a unit pulse response of a Gaussian low pass filter that is employed in one embodiment of the present invention.

FIG. 9 is a unit pulse response g(t) versus t/T graph illustrating a unit pulse response of a Gaussian low pass filter. The smoothing shaping filter applied in a Gaussian minimum shift keying (GMSK) system is called a Gaussian lowpass filter (GLPF). The filter response g(t) to a unit rectangular pulse is defined by the following:

$$g(t) = \frac{1}{2}\left[\text{erf}\left(\sqrt{\frac{2}{\ln 2}} \pi B_b T\left(\frac{1}{2} - \frac{t}{T}\right)\right) - \text{erf}\left(\sqrt{\frac{2}{\ln 2}} \pi B_b T\left(-\frac{1}{2} - \frac{t}{T}\right)\right)\right]$$

with $$\text{erf}(t) = \int_0^t \frac{1}{\sqrt{\pi}} e^{-y^2} dy.$$

The parameter $B_b T$ is employed to define a particular type of GLPF. For example, FIG. 9 illustrates a unit pulse response g(t) versus t/T graph when $B_b T$ is equal to 0.5. This system uses a frequency deviation ($f_d$) chosen to be 0.25 $f_b$, where $f_b$ is the bit rate. Since the unit pulse response extends to approximately three (3) bit periods, the effect of the unit pulse response over these three bit periods must be accounted for. In other words, the b(t) signal observed during certain bit periods results from three input data symbols (a current transmitting bit ($\alpha_n$), a previous transmitting bit ($\alpha_{n-1}$), and a next transmitting bit ($\alpha_{n-1}$)).

The current, previous, and next transmitting data symbols or bits can be grouped together to form a binary code ($\alpha_{n-1}$, $\alpha_n$, $\alpha_{n+1}$), where the previous transmitting bit is the most significant bit and the next transmitting bit is the least significant bit. By grouping the transmitted data in this manner, the real effect on any one bit can be seen (i.e., the effect of the previous and next bit on the current bit is accounted for). This binary code is referred to herein as a "transmitting pattern number." The transmitting pattern number ranges from 0 to 7. In other words, there can be eight (0–7) different binary codes given that the binary codes all have three bits. The data symbols can be either a one or a zero (i.e., $\alpha_i$=1 or 0). Each transmitting pattern number has a corresponding frequency variation trajectory or pulse response (i.e., a corresponding b(t) signal).

Figure 10:
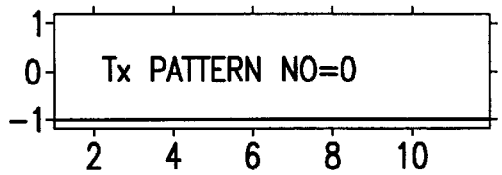
FIG. 10 illustrates eight possible frequency variation trajectories and corresponding transmitted data patterns that are utilized in one embodiment of the present invention.
Figure 10:
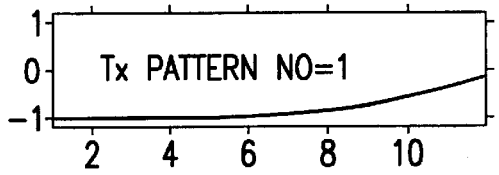
Figure 10:
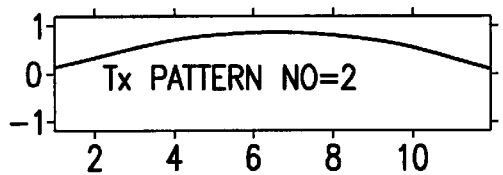
Figure 10:
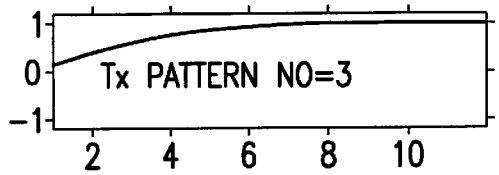
Figure 10:
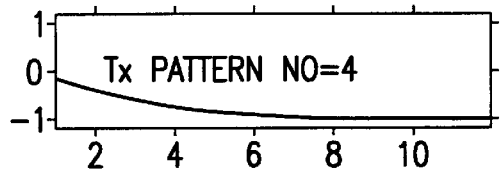
Figure 10:
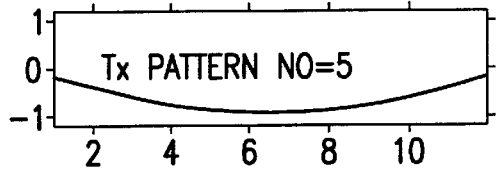
Figure 10:
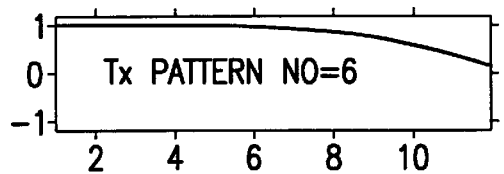
Figure 10:
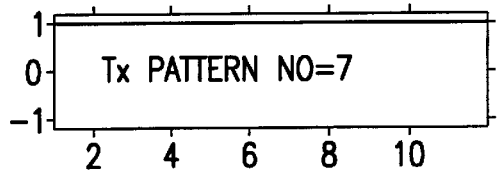
Figure 11:
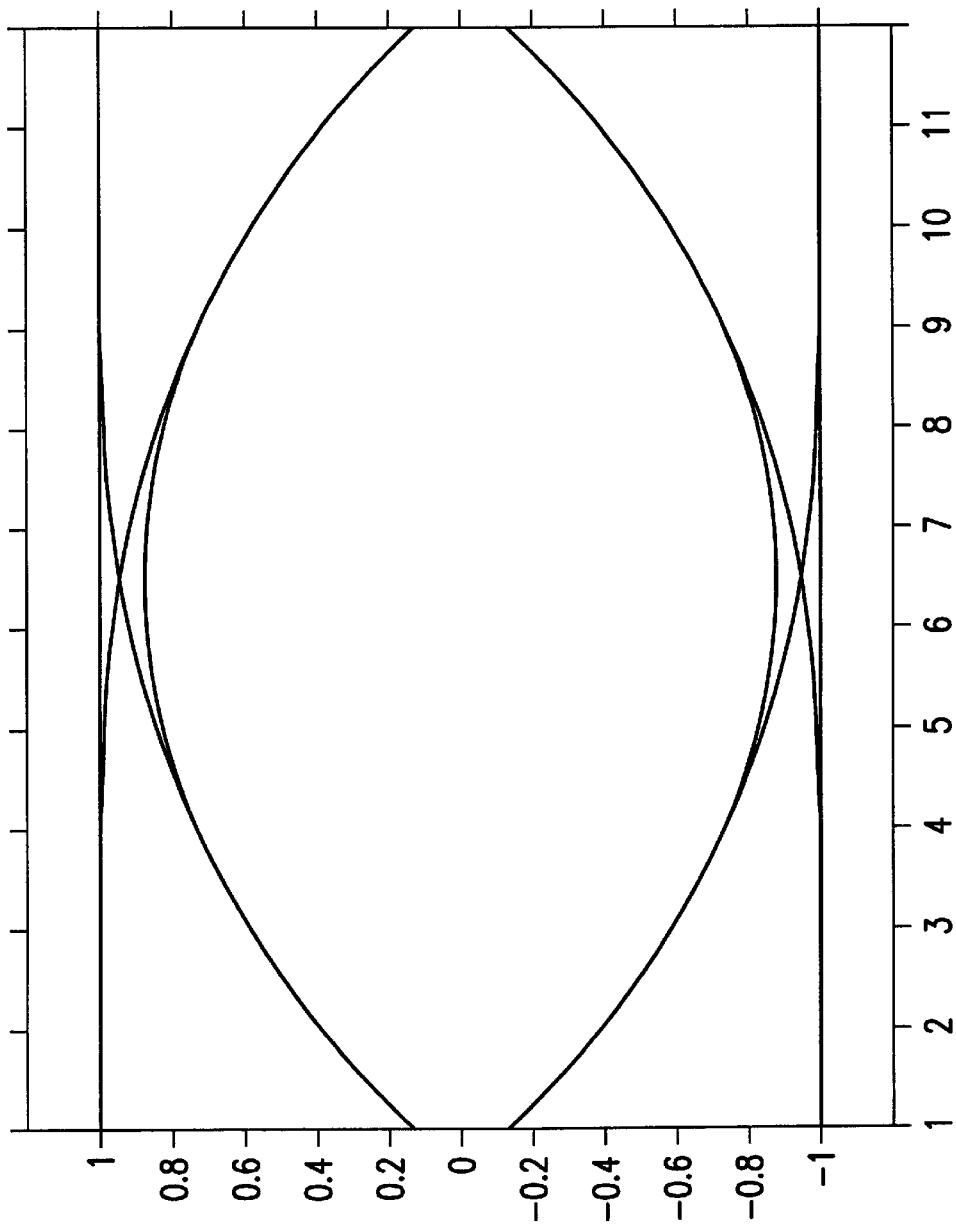
FIG. 11 is a graph illustrating the frequency trajectories of FIG. 10 all overlapped on a single graph.

In addition, FIG. 10 illustrates eight possible frequency variation trajectories (i.e., waveforms in the time domain) and the corresponding transmitting data numbers denoted in the graph as "Tx Pattern No." The units for the x-axis is the sample number during a bit period. As can be seen in FIG. 11, certain trajectories are symmetric about the X axis. For example the trajectories for pattern numbers 0, 1, 2, and 3 are symmetric with the trajectories for pattern numbers 7, 6, 5, and 4, respectively. Recognition of this symmetry leads to further circuit reduction as explained in greater detail with reference to FIGS. 6 and 8B.

Figure 3B:
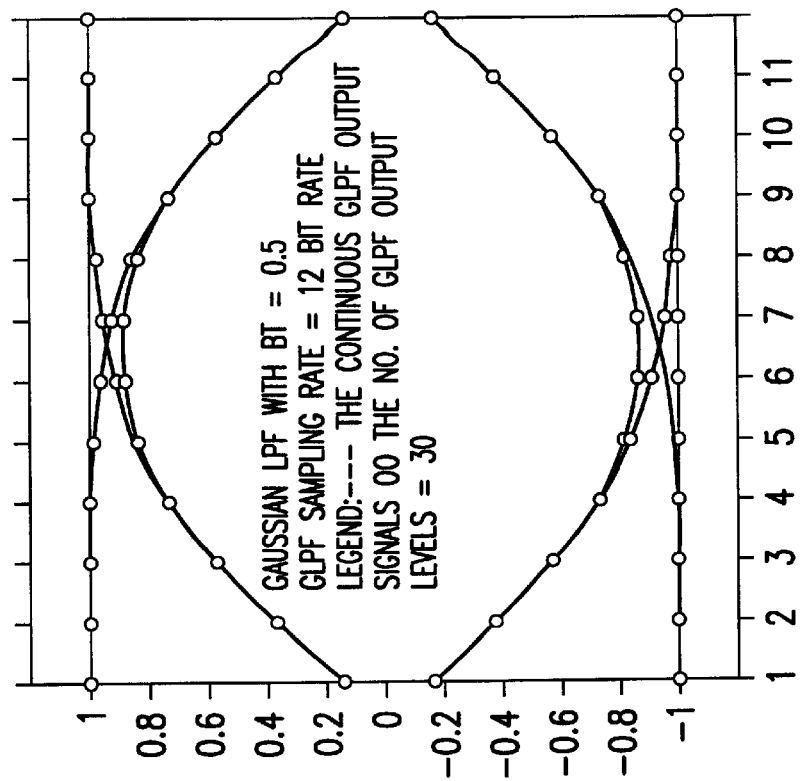
FIGS. 3(a) and 3(b) illustrate graphs of frequency variation trajectories for a GLPF having 68 output levels and 30 output levels, respectively.
Figure 3A:
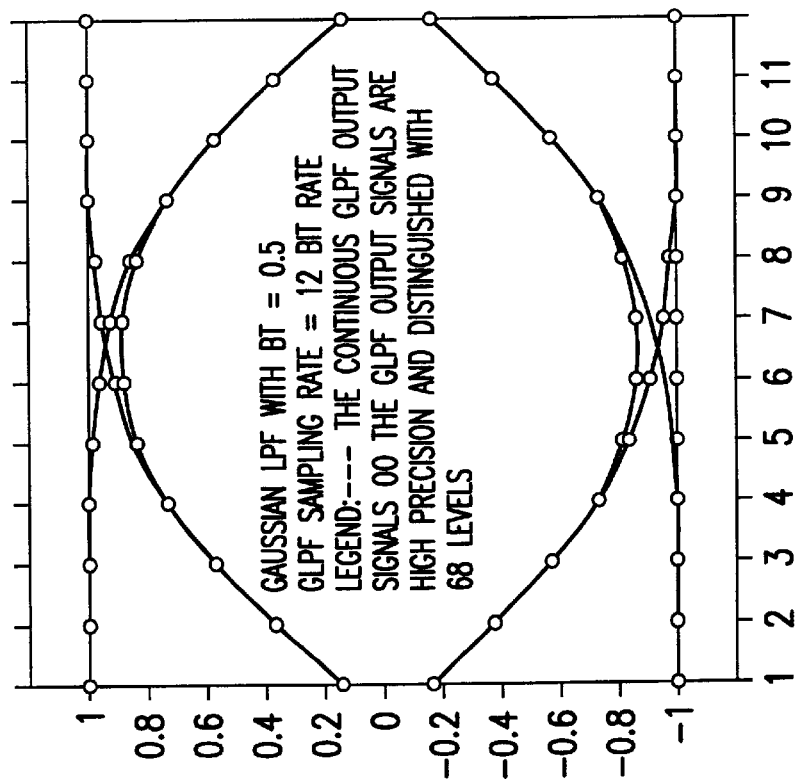
Figure 3C:
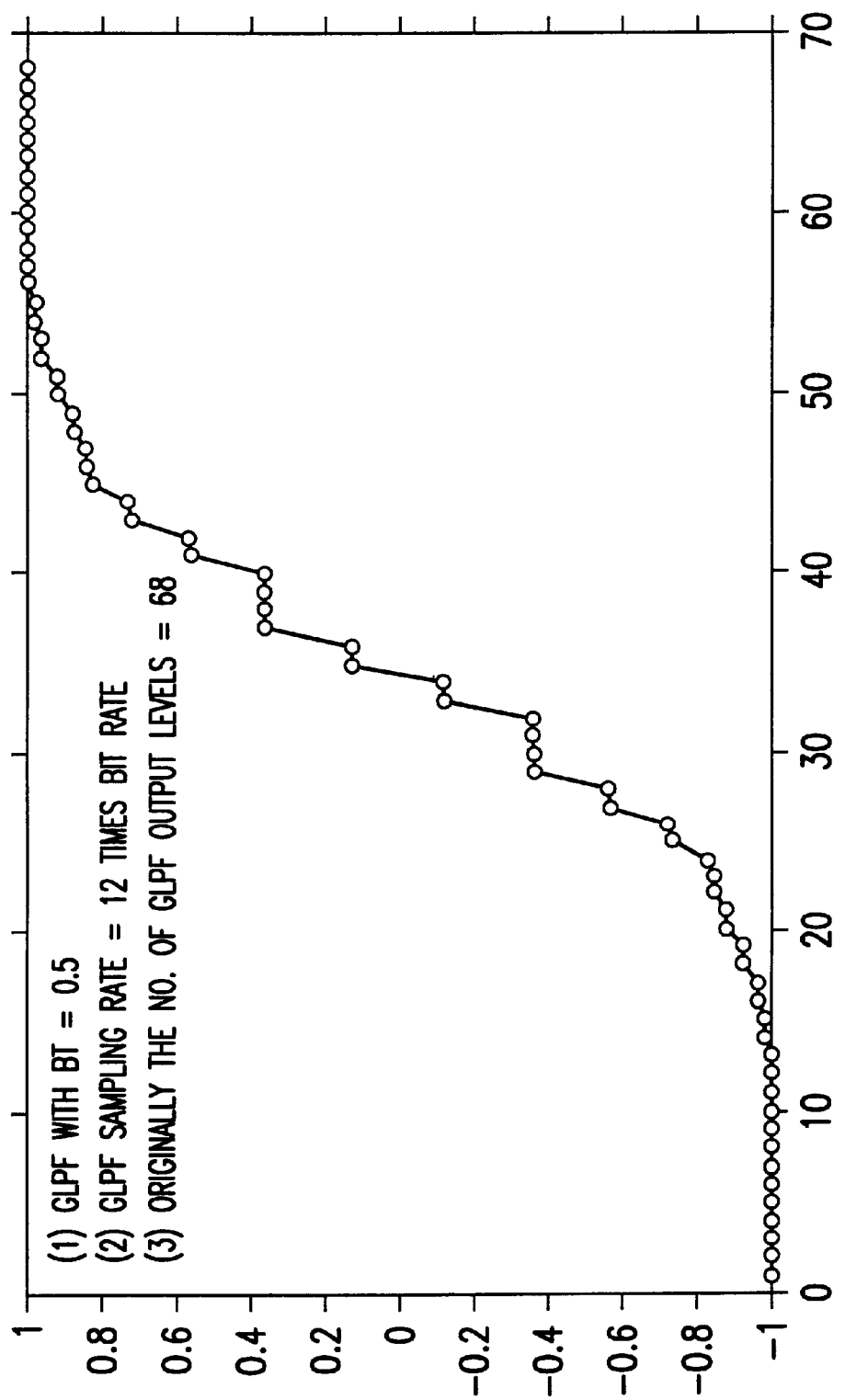
FIGS. 3(c) and 3(d) illustrate graphs of GLPF output levels for FIG. 3(a) and FIG. 3(b), respectively.

Referring to FIG. 3(a), when the eight possible frequency variation trajectories are overlapped, it is noted that the trajectories are symmetric about the X axis. The points denoted with a mark "o" are the output values of the GLPF operating at 12/T frequency. Among these possible GLPF output values, there are 68 distinct values that are plotted in FIG. 3(c) and denoted by a mark "o". Referring to FIG. 3(c), it is noted that the distribution of the output values of the GLPF is not uniform (i.e., non-linear). Accordingly, as explained hereinafter, the present invention utilizes a non-linear DAC with finite levels to simplify implementation of the modulator. For 68 different levels, a DAC with a minimum input width of 7 is needed since with 7 bits, 128 levels can be represented.

MODULATOR HAVING A MEMORY REDUCTION CIRCUIT

Figure 4:
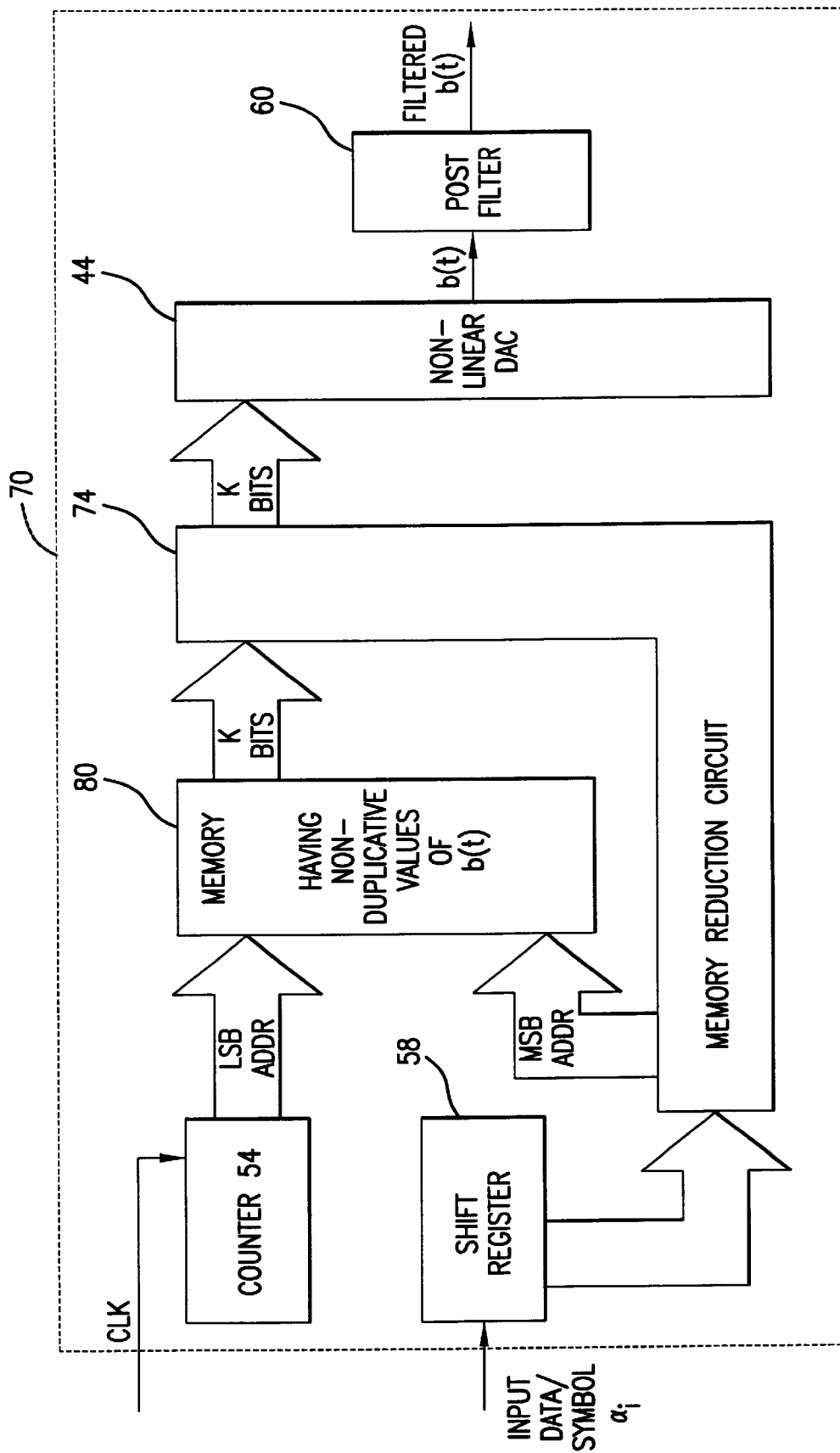
FIG. 4 is a block diagram illustrating in greater detail the single channel modulator of FIG. 2 configured in accordance to one embodiment of the present invention.

FIG. 4 is a block diagram illustrating in greater detail the single channel modulator of FIG. 2 configured in accordance to one embodiment of the present invention. The pulse shaping filter 24 can be implemented by a counter 54, a shift register 58 and a memory 80 described hereinafter. The counter 54 is provided to provide a high resolution digital form of g(t). The counter 54 includes an input for receiving a clock signal (CLK) and responsive thereto provides at least one address bit to the memory 80. The shift register 58 includes an input for receiving input data symbols ($\alpha_i$), and a parallel output that provides output signals to a memory reduction circuit 74, described hereinafter, based on the input data symbols. The input data symbols are shifted into the shift register 58 at a rate (known as the input data symbol rate) which is synchronous to the clock signal. The rate of the clock signal is equal to the number of segments (J) divided by time period (T) and the dock signal has a frequency ($f_s$) which is a multiple of the input data symbol rate.

It is noted that counter 54 and shift register 58 together form a memory access circuit that provides address signals to memory 80 and output signals to the memory reduction circuit 74. In operation, each data symbol is loaded into the shift register 58 in accordance with a synchronous symbol rate clock. Thereafter, the output signals of the shift register 58 are employed as upper address bits to address a section of the memory 80 having a corresponding frequency variation trajectory (i.e., one of the trajectories illustrated in FIG. 10) or pulse response. The counter 54 provides signals that are employed as lower address bits to address a portion of the section having the sub-samples of the selected pulse shaping response.

Memory 80 includes a plurality of inputs for receiving address signals and a plurality of outputs for providing information stored at the address specified by the address signals. The information in the memory 80 is accessed by providing an address. In a preferred embodiment, the memory 80 can be a read only memory (ROM). Memory 80 stores information that is useful in constructing a frequency variation trajectory b(t). This information can include different responses of the pulse shaping filter 24 to different input data symbols over a finite symbol interval, such as 3T. For example, the information can be digital representations of the eight possible frequency variation trajectories illustrated in FIG. 10. As explained hereinafter with reference to FIGS. 6 and 8B, memory 80 preferably stores only non-duplicative values of b(t). The output of the ROM 80 is provided to the digital to analog converter (DAC) 44 that converts the digital output of the ROM 80 into a corresponding analog value b(t). In the preferred embodiments, DAC 44 can include 7 bits and 68 levels or 5 bits and 30 levels. The analog value is provided to a post filter 60 for filtering the b(t) signal of FIG. 2. A memory reduction circuit 74 is interposed between memory 80 and DAC 44 and is described in greater detail hereinafter with reference to FIG. 6.

Size of Memory 80

The memory 80 can be implemented with a 96 by 7 bit ROM. In this example, the sampling rate is 12/T. Samples of the frequency variation trajectories are stored in a memory 80. For example, in this embodiment, there are 8 trajectories with 12 samples for each trajectory, and each sample is represented by 7 bits (i.e., 7 bits are needed to distinguish between the 68 GLPF output levels). Accordingly, the size of the memory can be 12 (samples/trajectory)*8 (trajectories)*7 (bits/sample), which is equal to 96*7 bits.

Reducing the Output Width of Memory 80

Figure 3D:
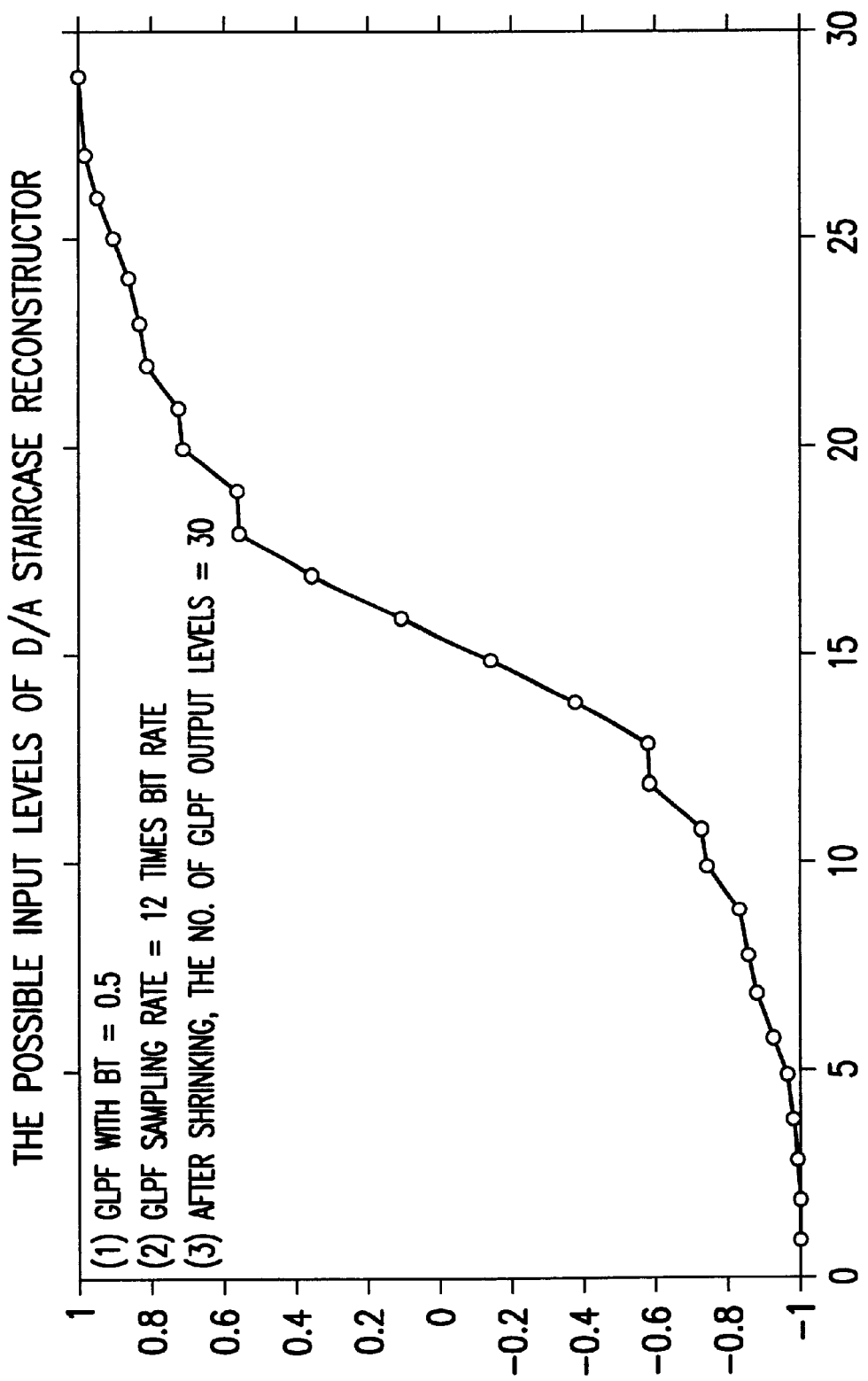

In an alternative embodiment, the output width of memory 80 is reduced from 7 bits to 5 bits. Referring to FIG. 3(c), the inventors have noted that when the output values of the GLPF are examined, some neighboring values are very close. For example, the y values are identical or very close at 0<x<10 and x>55. Thus, it is possible to merge some neighboring values to a certain value that can be supported by the non-linear DAC 44. In this embodiment, the number of levels is reduced from 68 to 30. Accordingly, only 5 bits are needed to represent the 30 levels. FIG. 3(d) illustrates these 30 modified GLPF output values, and FIG. 3(b) illustrates the overlapped frequency variation trajectories corresponding to the reduced number of GLPF output values. As the number of GLPF output levels is reduced from 68 to 30 levels, the width of memory 80 can be reduced from 7 bits to 5 bits. Comparing FIGS. 3(a) and 3(b), it is noted that the reduction in the number of output levels does not significantly affect the waveform of the frequency variation trajectories.

Reducing the Size of Memory 80

Referring to FIG. 3B, as explained previously, certain frequency variation trajectories are symmetric about the X axis. For example, group 1 (pattern numbers 0,1,2,3 ) are sign-reverse symmetric (i.e., b=−a) with group 2 (pattern numbers 7,6,5,4). Accordingly, only 4 trajectories (corresponding to pattern numbers 0,1,2,3) need to be stored in memory 80, and the sample values can be represented by 2's complement. In 2's complement format, the most significant bit is a sign bit. In this embodiment, the input data symbol $a_{n-1}$ determines which trajectory group should be loaded into the DAC 44. When $a_{n-1}$ is equal to 0, trajectory group 1 is accessed. When $a_{n-1}$ is equal to 1, trajectory group 2 is accessed by obtaining the contents of memory corresponding to group 1 and inverting the contents (i.e., changing the sign of the contents).

Therefore, after applying the reduction of GLPF output levels and symmetry characteristics of the frequency variation trajectories, the memory 80 can have the following size: 12 (samples/trajectory)*4 (trajectories)*5 (bits/sample)= 48*5 bits.

The clock signal can have a frequency of 13.824 MHz. As a result, the counter 54 can be a four bit interpolation counter with modulus 12 (N=12) (i.e., the counter counts from state 0 (LLLL) to state 11 (HLHH) cyclically) that provides lower address bits (b3, b2, b1,b0) to the memory 80. The shift register 58 can be a 3 bit shift register having three stages that provides the upper address bits (b6, b5, b4) to memory 80. Thus, in this embodiment, all possible frequency variation trajectories can be stored in the memory 80.

As described above, the g(t) waveform is often symmetric about the X axis. Accordingly, the present invention reduces the size of the memory 80 by storing only non-duplicative absolute values of the frequency variation trajectories or pulse responses and provides a memory reduction scheme, which is described in greater detail hereinafter with reference to FIGS. 6 and 8B.

A First Architecture for the Single Channel Modulator of FIG. 4

Figure 5:
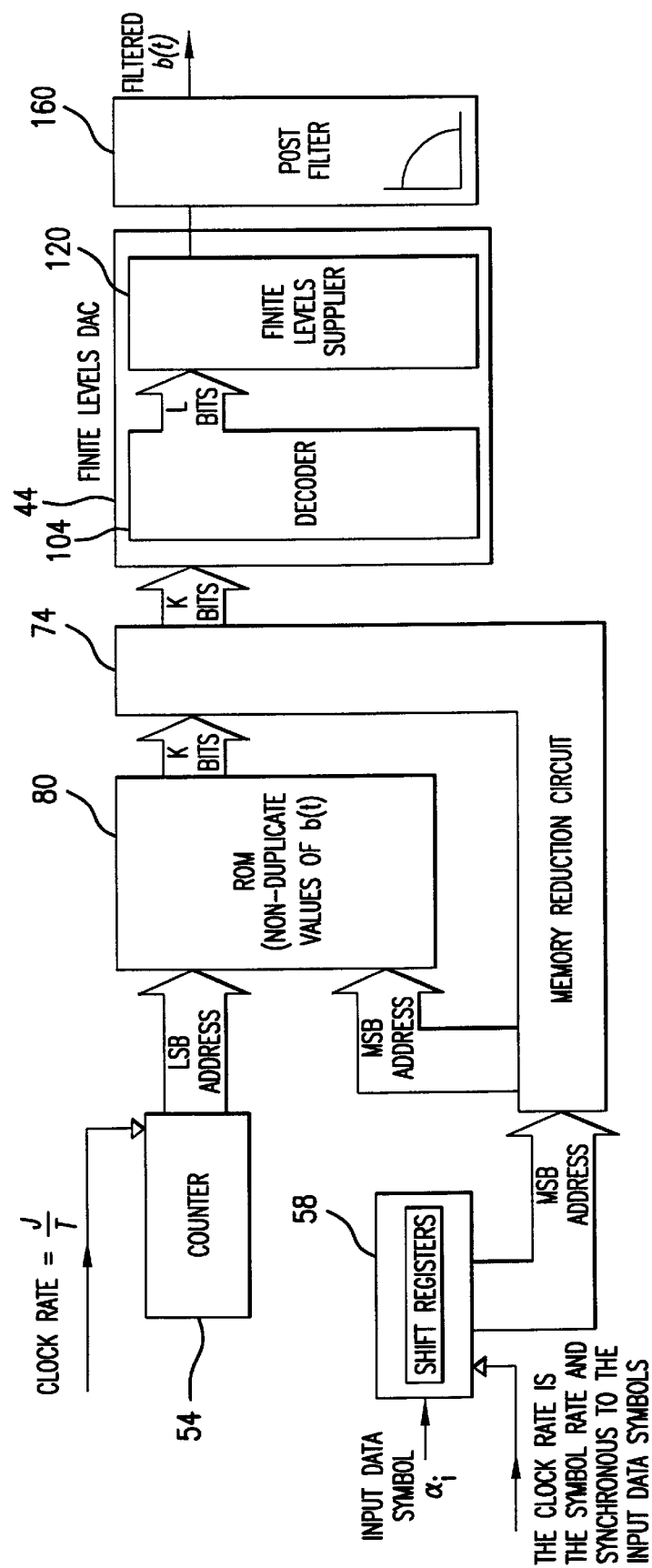
FIG. 5 illustrates in greater detail the single channel modulator of FIG. 4 configured in accordance to one embodiment of the present invention.

FIG. 5 is a block diagram illustrating a first architecture for the modulator of FIG. 4 in accordance to one embodiment of the present invention. In order to properly reconstruct the digital value of a response to a pulse shaping filter with the non-duplicative values of b(t), a memory size reduction circuit 74 is provided. The memory size reduction circuit 74 is coupled to the shift register 58 to receive the input data symbols and, based on the input data symbols, generates a portion of the address signals provided to the memory 80. In this embodiment, the memory size reduction circuit 74 generates the upper address bits and provides these upper address bits to the memory 80. The lower address bits are still provided by the counter 54. The description of components denoted with a common label and numeral in FIG. 5 is similar to that described with reference to FIG. 4 and will not be repeated herein.

In this first architecture, non-linear DAC 44 includes a decoder 104 that is coupled to the memory reduction circuit 74. Decoder 104 receives input signals (K bits) from memory reduction circuit 74, decodes the input signals, and generates control signals (L bits) based on the input signals. The DAC 44 also includes a finite levels supplier 120 that is coupled to the decoder 104. Finite levels supplier 120 generates levels for the non-linear digital to analog converter (DAC) based on the control signals from decoder 104.

An Implementation for Memory Reduction Circuit 74

Figure 6:
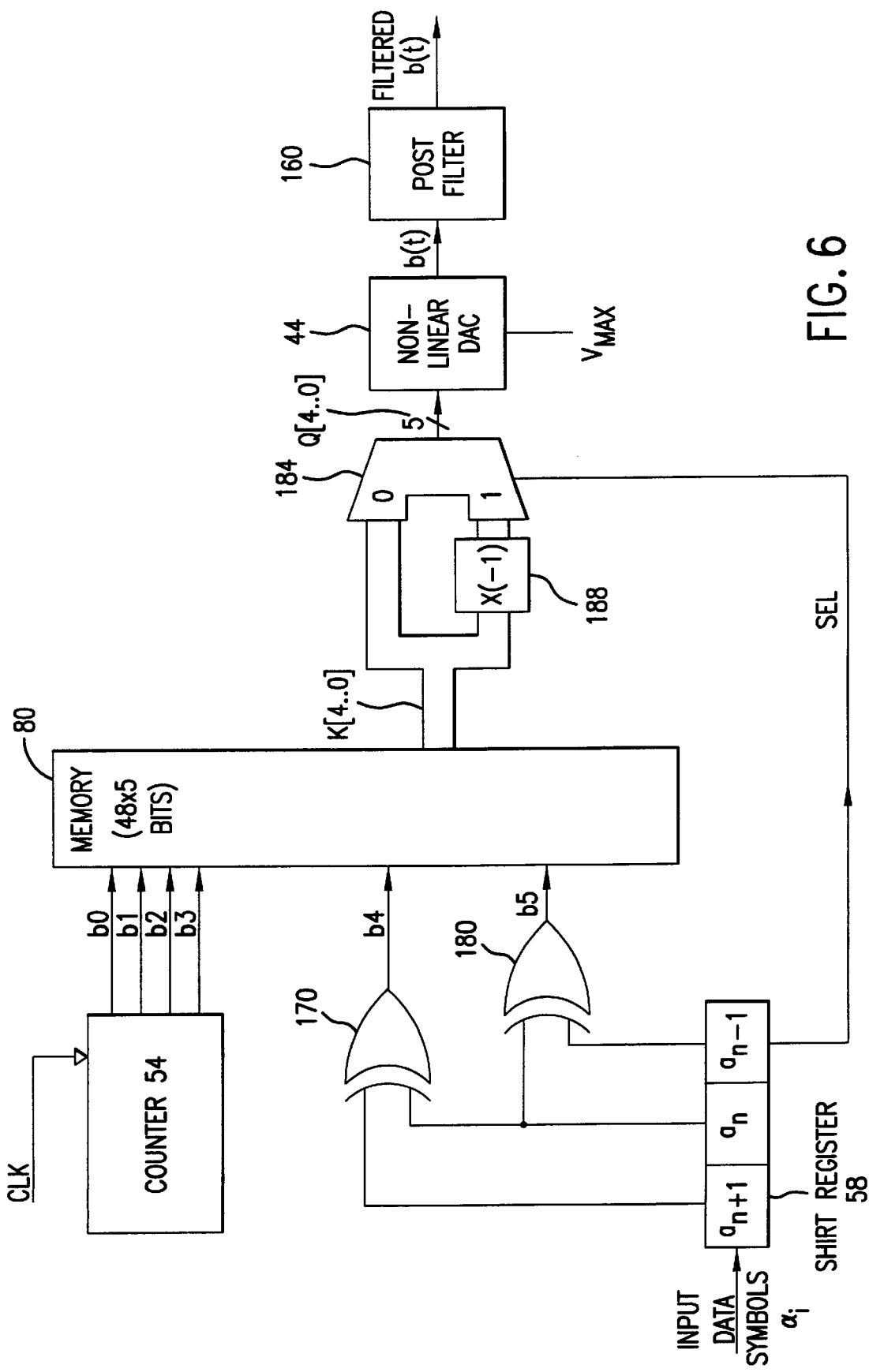
FIG. 6 illustrates in greater detail the memory reduction circuit of FIG. 5.

FIG. 6 illustrates in greater detail the memory reduction circuit of FIG. 5 configured in accordance to one embodiment of the present invention. As previously described with reference to FIG. 11, when the eight possible frequency variation patterns are overlapped, these patterns are symmetric about the X axis. Therefore, only four frequency variation trajectories of the eight need to be stored in memory 80. Specifically, forty-eight samples (i.e., 4 (trajectories)*12 (samples/trajectory)) are stored in memory 80. Accordingly, the memory 80 can be implemented with a 48 by 5 bit ROM. In this regard, memory 80 has an output that provides output signals K[4 . . . 0].

The memory reduction circuit 74 indudes a first exclusive-OR (XOR) gate 170, a second XOR gate 180, a multiplexer (MUX) 184, and a sign reversing circuit 188. First XOR gate 170 has a first input coupled to the next bit ($a_{n+1}$) of the shift register 58, a second input coupled to the current bit ($a_n$) of the shift register 58, and an output for providing an address signal (b4) to the memory 80. Second XOR gate 180 has a first input coupled to the current bit ($a_n$) of the shift register 58, a second input coupled to the previous bit ($a_{n-1}$) of the shift register 58, and an output for providing an address (b5) to the memory 80.

Sign reversing circuit 188 is coupled to memory 80 to receive output K[4 . . . 0], and based thereon generates an output having the same absolute value as the input, but with an opposite sign (i.e., circuit 188 multiplies its input with a negative one). MUX 184 includes a first input for receiving the output K[4 . . . 0] of memory 80 and a second input for receiving the output of sign reversing circuit 188, and a third input for receiving a select signal (SEL) from the previous bit ($a_{n-1}$) of shift register 58. Based on these inputs, MUX 184 selects either the output of the memory 80 or the modified output of the memory 80 (i.e., the output of memory 80 multiplied by negative one) based on the select signal (SEL). The output signals Q[4 . . . 0 ] of the MUX 184 are provided to non-linear DAC 44. MUX 184 and sign reversing circuit 188 can be synthesized by integrated circuit (IC) design tools that are known by those of ordinary skill in the art.

Accordingly, memory size reduction circuit 74 selectively provides to DAC 44 either (1) the output of the memory 80 or (2) the output of the memory 80 multiplied by (−1) based on a previous transmitting bit ($a_{n-1}$) of shift register 58. Since the other elements in FIG. 6 are substantially the same as those described earlier in FIGS. 4 and 5, the same numerals are used to designate these components, and these components are not described further herein.

Figure 7:
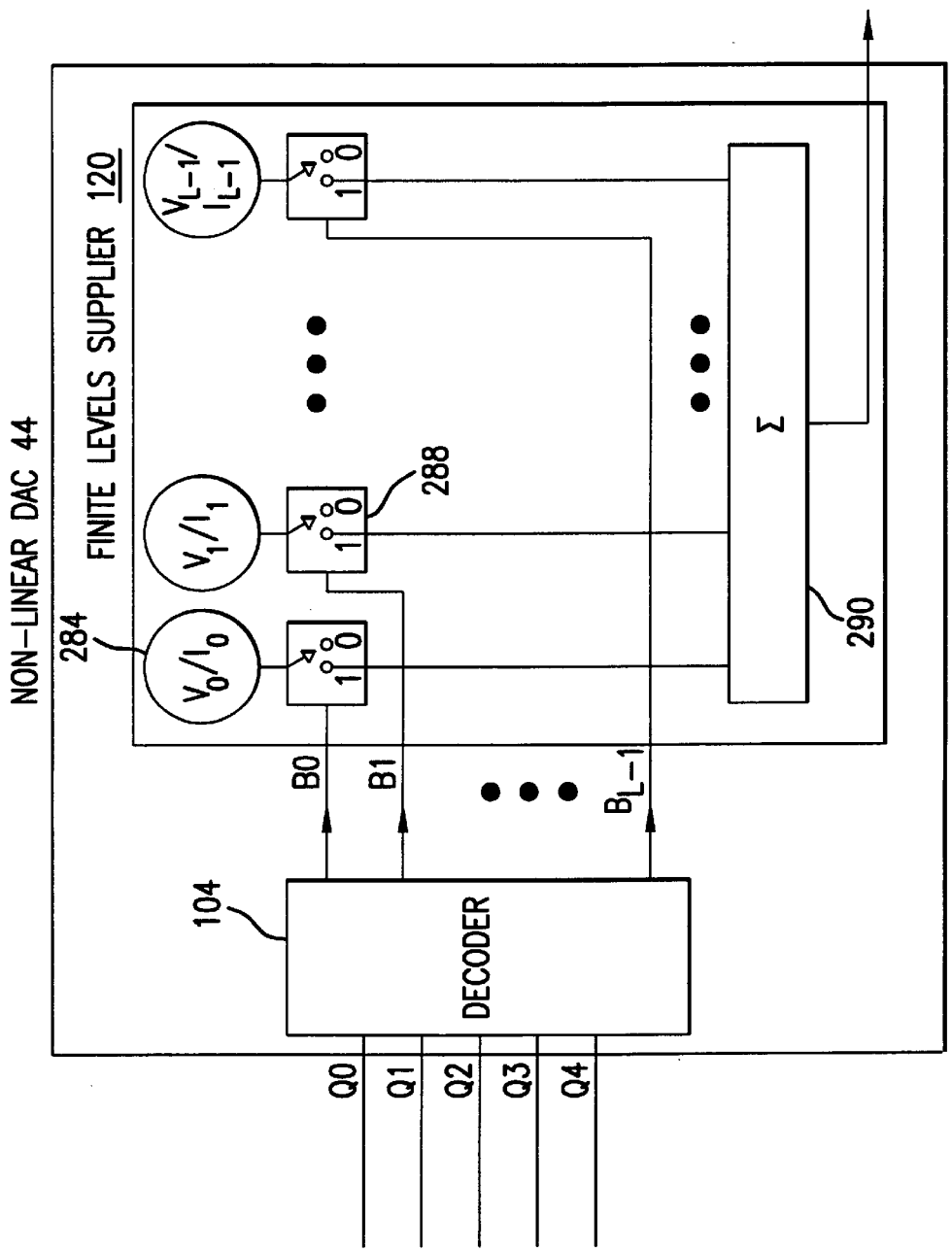
FIG. 7 illustrates in greater detail the nonlinear DAC of FIG. 6.

FIG. 7 illustrates in greater detail the non-linear DAC 44 of FIG. 6. Non-linear DAC 44 includes a decoder 104 that is coupled to MUX 184 to receive signals Q[4 . . . 0] and a finite levels supplier 120 coupled to decoder 104. Decoder 104 decodes the received signals and provides control signals B[(L−1) . . . 0].

Finite levels supplier 120 includes a plurality of voltage or current suppliers 284 for supplying a voltage or a current, a plurality of switches 288, and a summation circuit 290. Each switch 288 is coupled to a respective voltage supplier 284 and generates an output. Each switch 228 also receives and is controlled by a respective control signal provided by decoder 104. Summation circuit 290 is coupled to the voltage suppliers 284 for summing the outputs of the voltage suppliers 284. The present invention can use L suppliers to generate the required Q levels of DAC output. For example, 10 suppliers (i.e., L=10) can be used to generate 30 output levels. These output levels can be non-uniform (i.e., not linear).

A Second Architecture for the Single Channel Modulator of FIG. 4

Figure 8A:
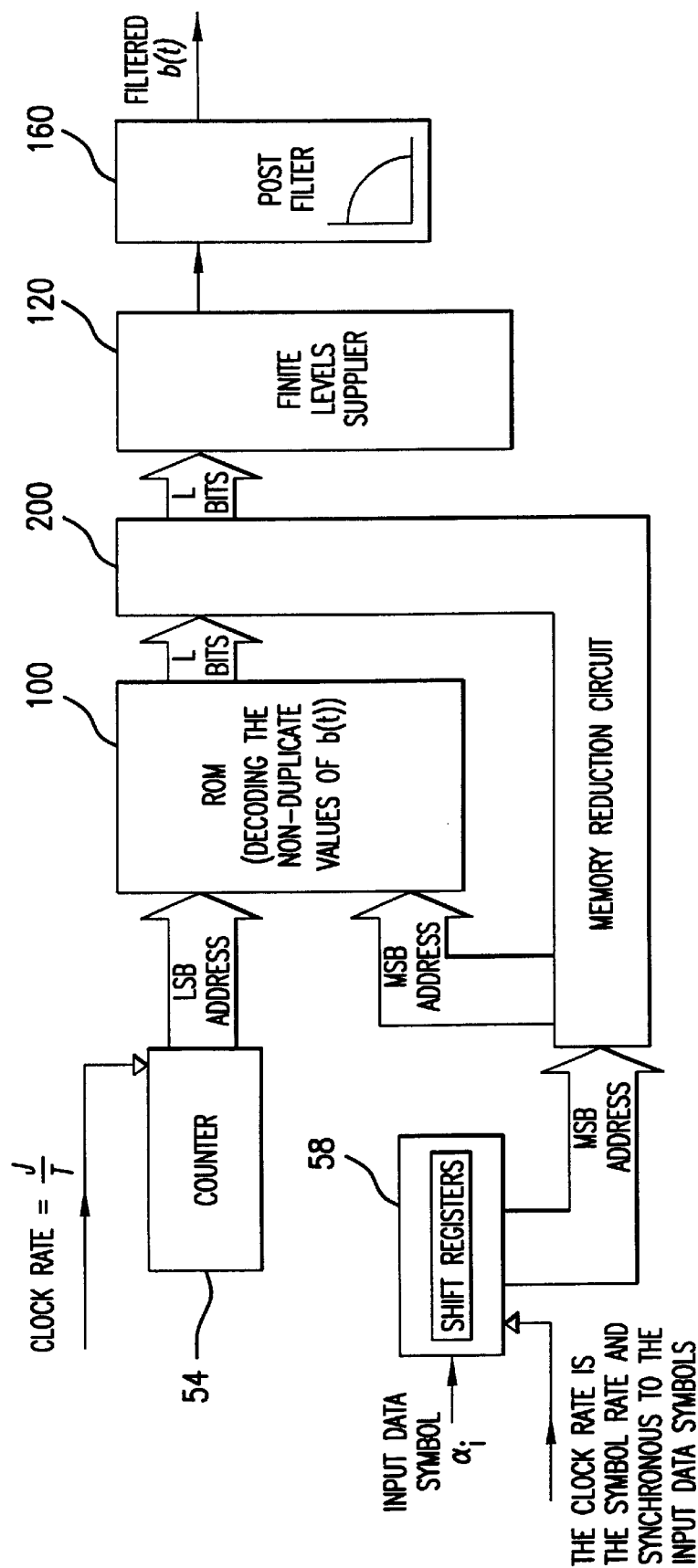
FIG. 8A illustrates in greater detail the single channel modulator of FIG. 4 configured in accordance to a second embodiment of the present invention.

FIG. 8A is a block diagram illustrating a second architecture for the modulator of FIG. 4 configured in accordance to an alternative embodiment of the present invention. This second architecture includes a counter 54, a shift register 58, a memory 100 that is different from memory 80 of FIG. 5, a memory reduction circuit 200, a finite levels supplier 120, and post filter 160. It is noted that decoder 104 of FIG. 5 is removed in this embodiment. Accordingly, a memory 100 is provided that performs a decoding function. Memory 100 includes non-duplicative values of the frequency variation trajectories and also is configured to perform a decoding operation on the memory contents. The configuring of memory 100 to perform a decoding function is described in greater detail hereinafter with reference to FIG. 12. Memory 100 provides L bits to memory reduction circuit 200, where L is greater than or equal to K, shown in FIG. 5. In response, memory reduction circuit 200 generates an output having L bits that is provided to finite levels supplier 120. The memory reduction circuit 200 can be implemented using the circuits shown in FIG. 8B.

An Implementation for Memory Reduction Circuit 200

Figure 8B:
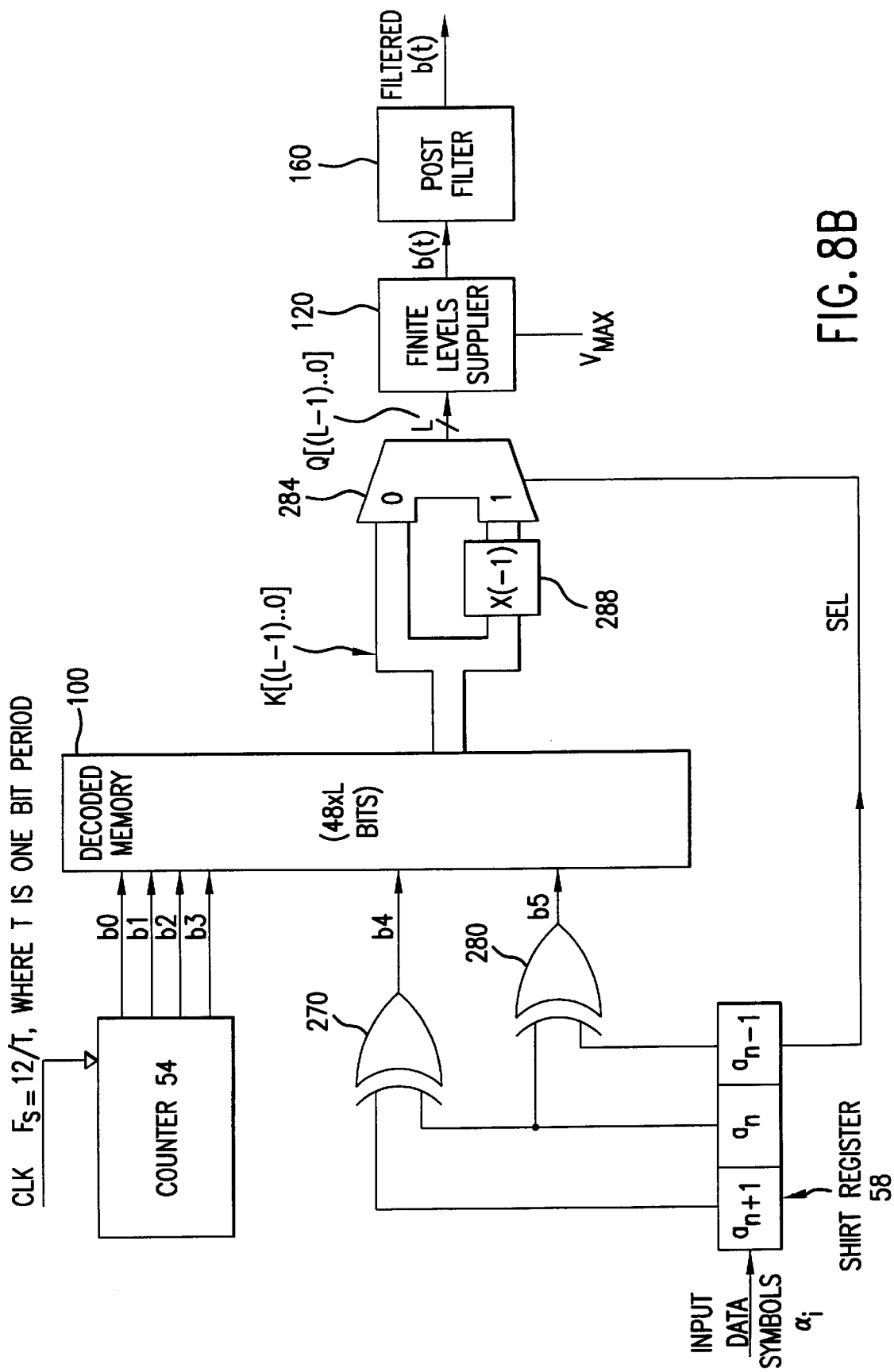
FIG. 8B illustrates in greater detail the memory reduction circuit of FIG. 8A.

FIG. 8B illustrates in greater detail the memory reduction circuit 200 of FIG. 8A configured in accordance to one embodiment of the present invention. The operation of memory reduction circuit 200 is similar to memory reduction circuit 74 except that DAC 44 is replaced with a finite levels supplier 120, and memory 80 is replaced with a decoded memory 100 that has an output having L bits instead of K bits.

Decoded memory 100 stores information that controls finite levels supplier 120 in the construction of frequency variation trajectory b(t). The stored information are digital representations that correspond to the reduced 30 levels of frequency variation trajectories shown in FIG. 3(d). Each level of frequency variation trajectories can be represented by an index value that is previously decoded to control the operation of finite levels supplier 120. In this regard, the waveform of FIG. 3(d) can be represented as a table. FIG. 12 is a table illustrating the frequency trajectories corresponding to the transmitting data bits that can be stored in memory 100. Specifically, the table of FIG. 12 illustrates the relationship between the transmitting data bits and the frequency variation trajectories that correspond to an index value at every sampling time. As can be seen from FIG. 12, when the index values are considered as ranges of waveforms, the index values exhibit symmetry. Accordingly, this symmetry can be exploited so that only one/half of the index values need to be stored in memory 100. In this embodiment, each index value is represented by L bits.

The memory reduction circuit 200 includes a first exclusive-OR (XOR) gate 270, a second XOR gate 280, a multiplexer (MUX) 284, and a sign reversing circuit 288. First XOR gate 270 has a first input coupled to the next bit ($a_{n+1}$) of the shift register 58, a second input coupled to the current bit ($a_n$) of the shift register 58, and an output for providing an address signal (b4) to the memory 100. Second XOR gate 280 has a first input coupled to the current bit ($a_n$) of the shift register 58, a second input coupled to the previous bit ($a_{n-1}$) of the shift register 58, and an output for providing an address (b5) to the memory 100.

Sign reversing circuit 288 is coupled to memory 100 to receive output K[(L−1) . . . 0], and based thereon generates an output having the same absolute value as the input, but with an opposite sign (i.e., circuit 288 multiplies its input with a negative one). MUX 284 includes a first input for receiving the output K[(L−1) . . . 0] of memory 100 and a second input for receiving the output of sign reversing circuit 288, and a third input for receiving a select signal (SEL) from previous transmitting bit ($a_{n-1}$) of shift register 58. Based on these inputs, MUX 284 selects either the output of the memory 100 or the output of sign reversing circuit 288 (i.e., the output of memory 100 multiplied by negative one) based on the select signal (SEL). The output signals Q[(L−1) . . . 0] of the MUX 284 are provided to finite levels supplier 120. MUX 284 and sign reversing circuit 288 can be synthesized by integrated circuit (IC) design tools that are known by those of ordinary skill in the art. Finite levels supplier 120 can be implemented as shown in FIG. 7. Since the other elements in FIG. 8B are substantially the same as those described earlier in FIGS. 4 and 5, the same numerals are used to designate these components, and these components are not described further herein.

As shown and described above, the present invention provides the following advantages for a modulator: (1) the memory size is reduced by one-half from 96 to 48 entries; (2) the memory width is decreased from 8 bits to 6 bits or 5 bits; and (3) the DAC is simplified from 8 bits to 6 bits or 5 bits. It is noted that a DAC with fewer bits is possible, and depending on the application, the minimum number of bits for the DAC is limited only by the required performance parameters, such as the outband spectrum or the modulation signal and the acceptable amount of distortion in the waveform. All of these advantages contribute to the achievement of a more cost effective modulator. It is contemplated that the present invention can be implemented in software, hardware, firmware or a combination of the above.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A modulator comprising:
   a) a memory for storing information, said memory having an input for receiving a plurality of address signals and an output for providing a digital output signal based on the received address signals;
   b) an access circuit, coupled to the memory, for providing a set of address signals to the memory and output signals;
   c) a memory reduction circuit, coupled to the access circuit, for receiving the output signals of the access circuit and responsive thereto for providing address signals to the memory, and coupled to the memory for receiving the digital output signal and providing an output signal based on the digital output signal; and
   d) a digital to analog converter (DAC), coupled to the memory reduction circuit, for converting the output of the memory reduction circuit to an analog value.

2. The modulator of claim 1 wherein the digital to analog converter (DAC) indudes a non-linear digital to analog converter (DAC).

3. The modulator of claim 2 wherein the non-linear digital to analog converter (DAC) includes
   a decoder coupled to the memory reduction circuit for receiving input signals, decoding the input signals, and generating control signals based on the input signals; and
   a finite level supplier coupled to the decoder for generating levels for the non-linear digital to analog converter (DAC) based on the control signals.

4. The modulator of claim 3 wherein the finite levels supplier includes a plurality of voltage suppliers, a plurality of switches, each switch coupled to a respective voltage supplier for generating an output, and a summation circuit coupled to the voltage suppliers for summing the outputs of the voltage supplies.

5. The modulator of claim 3 wherein the finite levels supplier indudes a plurality of current suppliers, a plurality of switches, each switch coupled to a respective current supplier for generating an output, and a summation circuit coupled to the current suppliers for summing the outputs of the current suppliers.

6. The modulator of claim 1 wherein the memory includes non-duplicative frequency variation trajectories.

7. The modulator of claim 1 wherein the digital to analog converter (DAC) includes a finite levels supplier coupled to the memory reduction circuit, and wherein the memory includes decoded non-duplicative frequency variation trajectories, said memory performing a decoding function.

8. The modulator of claim 7 wherein the finite levels supplier includes a plurality of voltage suppliers, a plurality of switches, each switch coupled to a respective voltage supplier for generating an output, and a summation circuit coupled to the voltage suppliers for summing the outputs of the voltage suppliers.

9. The modulator of claim 7 wherein the finite levels supplier includes a plurality of current suppliers, a plurality of switches, each switch coupled to a respective current supplier for generating an output, and a summation circuit coupled to the current suppliers for summing the outputs of the current suppliers.

10. The modulator of claim 1 wherein the memory access circuit further includes
    a) a counter, coupled to the memory, for providing a first set of address signals to the memory; and
    b) a shift register, coupled to the memory reduction circuit, for providing the output signals.

11. The modulator of claim 10 wherein the memory reduction circuit further includes
    a) a sign reversing circuit having an input coupled to the memory for multiplying the input with negative one;
    b) a multiplexer having a first input coupled to the memory, a second input coupled to the sign reversing circuit, a third input coupled to the shift register, and an output coupled to the DAC;
    c) a first exclusive OR gate, coupled to the shift register and memory, for providing a first address signal to the memory; and
    d) a second exclusive OR gate, coupled to the shift register and memory, for providing a second address signal to the memory.

12. The modulator of claim 7 wherein memory reduction circuit further includes
    a) a sign reversing circuit having an input coupled to the memory for multiplying the input with negative one;
    b) a multiplexer having a first input coupled to the memory, a second input coupled to the sign reversing circuit, a third input coupled to the shift register, and an output coupled to the DAC;
    c) a first exclusive OR gate, coupled to the shift register and memory, for providing a first address signal to the memory; and
    d) a second exclusive OR gate, coupled to the shift register and memory, for providing a second address signal to the memory.

13. The modulator of claim 1 further including an analog post filter coupled to the digital to analog converter (DAC).

14. The modulator of claim 13 further including a voltage controlled oscillator (VCO) coupled to the post filter.

15. The modulator of claim 1 wherein the digital to analog converter includes 7 bits and 68 levels.

16. The modulator of claim 1 wherein the digital to analog converter includes 5 bits and 30 levels.

17. The modulator of claim 10 wherein the counter is a N=12 interpolation counter.

18. The modulator of claim 10 wherein the shift register is a 3 stage, 3 bit shift register.

19. The modulator of claim 1 wherein the memory is a 96 by 7 bits read only memory (ROM).

20. The modulator of claim 1 wherein the memory is a 48 by 5 bits read only memory (ROM).

21. In a modulator having a memory for storing frequency variation trajectories, said memory having a size and width, and a digital to analog converter (DAC) having a number of levels, coupled to the memory, a method for simplifying the implementation of the modulator comprising the steps of:
    reducing the width of the memory by reducing the number of output levels of the digital to analog converter (DAC); and
    reducing the size of the memory by exploiting the symmetry of frequency variation trajectories about a first axis.

* * * * *